(12) United States Patent
Boucké et al.

(10) Patent No.: US 12,157,290 B2
(45) Date of Patent: Dec. 3, 2024

(54) DECORATIVE PANEL AND METHOD OF MANUFACTURING A DECORATIVE PANEL

(71) Applicant: I4F Licensing NV, Turnhout (BE)

(72) Inventors: Eddy Alberic Boucké, Menen (BE); Sander Gordon Zweed, Huizen (NL)

(73) Assignee: i4F Licensing NV, Turnhout (BE)

( * ) Notice: Subject to any disclaimer, the term of this patent is extended or adjusted under 35 U.S.C. 154(b) by 210 days.

(21) Appl. No.: 17/791,614

(22) PCT Filed: Jan. 11, 2021

(86) PCT No.: PCT/EP2021/050354
§ 371 (c)(1),
(2) Date: Jul. 8, 2022

(87) PCT Pub. No.: WO2021/140241
PCT Pub. Date: Jul. 15, 2021

(65) Prior Publication Data
US 2023/0024890 A1    Jan. 26, 2023

(30) Foreign Application Priority Data
Jan. 9, 2020 (NL) .................................... 2024629

(51) Int. Cl.
*B32B 21/00* (2006.01)
*B32B 3/06* (2006.01)
(Continued)

(52) U.S. Cl.
CPC ............ *B32B 21/047* (2013.01); *B32B 3/06* (2013.01); *B32B 5/18* (2013.01); *B32B 5/32* (2013.01);
(Continued)

(58) Field of Classification Search
CPC ........ B32B 2307/72; B32B 2307/7246; B32B 2307/7265; B32B 2307/732;
(Continued)

(56) References Cited

U.S. PATENT DOCUMENTS 4,101,704 A * 7/1978 Hiles ................... C08G 18/4825
428/218
5,103,614 A * 4/1992 Kawaguchi ........... E04F 15/181
52/392

(Continued)

FOREIGN PATENT DOCUMENTS

DE    102017007513 A1    2/2019
EP       2615209 A1    7/2013
(Continued)

OTHER PUBLICATIONS

"Wood foam—a product on the rise? Wood based panels", https://www.wpbionline.com/features/wood-foam-a-product-on-the-rise-6097690/, Mar. 28, 2018, pp. 1-4.
(Continued)

*Primary Examiner* — Mark R Wendell
(74) *Attorney, Agent, or Firm* — The Webb Law Firm (57) ABSTRACT

The invention relates to a decorative panel, in particular a floor panel, ceiling panel or wall panel, and to a method for manufacturing such decorative panel. The panel according to the present invention comprises includes at least one foamed layer comprising including an upper side and a lower side, and at least one decorative solid layer either directly or indirectly, affixed on said upper side of the foamed layer, wherein both the foamed layer and the decorative solid layer are wood based materials. The invention also relates to a floor covering consisting of a plurality of such panels.

20 Claims, 2 Drawing Sheets

(51) Int. Cl.
*B32B 5/18* (2006.01)
*B32B 5/32* (2006.01)
*B32B 7/12* (2006.01)
*B32B 21/04* (2006.01)
*B32B 21/14* (2006.01)
*E04F 13/08* (2006.01)
*E04F 13/10* (2006.01)
*E04F 15/02* (2006.01)
*E04F 15/04* (2006.01)
*E04F 15/20* (2006.01)
*B32B 5/02* (2006.01)
*B32B 5/24* (2006.01)

(52) U.S. Cl.
CPC .............. *B32B 7/12* (2013.01); *B32B 21/042* (2013.01); *B32B 21/14* (2013.01); *E04F 13/0876* (2013.01); *E04F 13/0894* (2013.01); *E04F 13/10* (2013.01); *E04F 15/02038* (2013.01); *E04F 15/041* (2013.01); *E04F 15/206* (2013.01); *B32B 5/022* (2013.01); *B32B 5/245* (2013.01); *B32B 2255/28* (2013.01); *B32B 2260/02* (2013.01); *B32B 2260/04* (2013.01); *B32B 2262/067* (2013.01); *B32B 2307/72* (2013.01); *B32B 2307/7246* (2013.01); *B32B 2307/7265* (2013.01); *B32B 2307/732* (2013.01); *B32B 2607/00* (2013.01); *E04F 2201/0146* (2013.01); *E04F 2201/0153* (2013.01); *E04F 2201/042* (2013.01); *E04F 2201/043* (2013.01); *E04F 2290/043* (2013.01)

(58) Field of Classification Search
CPC ..... B32B 21/047; B32B 21/042; B32B 21/14; B32B 3/06; B32B 5/18; B32B 5/32; B32B 5/022; B32B 5/245; B32B 2255/28; B32B 2260/02; B32B 2260/04; E04F 13/0876; E04F 13/0894; E04F 13/10; E04F 15/02038; E04F 15/041; E04F 15/206; E04F 2201/0146; E04F 2201/0153; E04F 2201/042; E04F 2201/043

See application file for complete search history.

(56) References Cited

U.S. PATENT DOCUMENTS

| | | | |
|---|---|---|---|
| 6,212,838 B1 * | 4/2001 | Eda | B32B 9/02 428/218 |
| 6,397,547 B1 * | 6/2002 | M.ang.rtensson | E04F 13/0878 52/592.1 |
| 8,196,366 B2 * | 6/2012 | Thiers | E04F 15/20 52/592.1 |
| 2003/0033777 A1 | 2/2003 | Thiers et al. | |
| 2015/0375471 A1 * | 12/2015 | Song | E04F 13/0885 156/304.3 |
| 2017/0305119 A1 | 10/2017 | Bergelin et al. | |
| 2018/0202166 A1 | 7/2018 | Culpepper et al. | |
| 2020/0318292 A1 | 10/2020 | Alden et al. | |
| 2020/0353722 A1 * | 11/2020 | Naeyaert | B32B 5/16 |
| 2022/0056703 A1 * | 2/2022 | Boucké | B32B 19/02 |
| 2023/0166247 A1 | 6/2023 | Klein et al. | |

FOREIGN PATENT DOCUMENTS

| | | |
|---|---|---|
| WO | 2018171913 A1 | 9/2018 |
| WO | 20181991181 A1 | 10/2018 |
| WO | WO2020020544 * | 1/2020 |

OTHER PUBLICATIONS

Ritter, "New Hybrid Material Made of Wood and Metal for Lightweight Construction", www.wki.fraunhofer.de, Feb. 2019, pp. 1-2.
Wisner et al., "Wood foam for sandwich elements in construction", Holzfaserwerkstoffe, 2020, pp. 34-41.

* cited by examiner

DECORATIVE PANEL AND METHOD OF MANUFACTURING A DECORATIVE PANEL

CROSS-REFERENCE TO RELATED APPLICATIONS

This application is the United States national phase of International Application No. PCT/EP2021/050354 filed Jan. 11, 2021, and claims priority to The Netherlands Patent Application No. 2024629 filed Jan. 9, 2020, the disclosures of which are hereby incorporated by reference in their entirety.

BACKGROUND OF THE INVENTION

Field of the Invention

The invention relates to a decorative panel, in particular a floor panel, ceiling panel or wall panel. The invention also relates to a decorative covering, in particular a decorative floor covering, decorative ceiling covering, or decorative wall covering, comprising a plurality of said decorative panels. The invention further relates to a method of manufacturing a decorative panel, in particular a floor panel, ceiling panel or wall panel.

Description of Related Art

Typically, decorative floor panels are composed of multi-layered decorative panels, which may be glued down onto a subfloor or which may be interconnected by providing the panels with coupling profiles, such as a tongue and groove. The layers used in the panels are typically synthetic polymers, such as polyvinyl chloride (PVC) and polyurethane (PU) based layers, wherein each layer typically has its own function and its own purpose, such as providing panel strength, a desired resiliency and/or rigidity, improved sound dampening properties, thermal stability, desired indentation properties, an attractive aesthetical appearance, improved recyclability properties, etcetera. Traditional flooring materials, like MDF/HDF, which were used in decorative panels for decades, are more and more replaced by synthetic polymers to further improve the overall panel properties. However, a topic of increasing concern with those synthetic polymer materials is the migration of possible harmful volatile and semi-volatile substances, such as plasticizers, added as additive to these synthetic polymers. Another issue using polyurethane-based materials is the discussion of recyclability. Incineration of polyurethane will result in poisonous gas, but both physical and chemical recycling of polyurethane experiences several technical and economic difficulties. Hence, there is a demand to replace existing synthetic polymers, used in nowadays decorative panels, by more natural sourced materials, in particular wood, without compromising the panel properties which can be achieved by using synthetic polymers, such as PVC and PU.

SUMMARY OF THE INVENTION

It is a first goal of the invention to provide a wood based alternative to synthetic polymers based decorative panels, without comprising panel properties.

It is a second goal of the invention to provide an improved wood based decorative panel.

It is a third goal of the invention to provide an improved wood based decorative panel having improved properties over traditional MDF/HDF based decorative panels.

At least one of these goals can be achieved by providing a decorative panel, in particular a floor panel, ceiling panel, wall panel, or furniture panel, comprising: at least one solid layer comprising an upper side and a lower side, wherein the solid layer is at least partially made of densified wood, and at least one foamed layer affixed, either directly or indirectly to the solid layer, wherein the foamed layer is at least partially made of wood foam, wherein the decorative panel is provided with a decorative top surface.

The use of a combination of foamed layer comprising wood foam and a solid layer comprising densified wood has several advantages. Both wood based layers have its own unique characteristics, even better than synthetic polymer based layers having an equivalent function, whereas the combination of both layers provides a further range of features which cannot be found in conventional MDF/HDF, or synthetic polymer based floor panels.

To start with the benefits of wood foam as such, the material provides a high fire-resistance, excellent sound dampening or sound insulation properties and a good heat insulation whilst still being a fully wood-based material. Further, wood foam is an extremely lightweight material due to its low density. It is experimentally found that wood foam has a sufficient resistance to moisture resulting in minimal bending or warping when submerged in water. Due to abovementioned qualities of wood foam the material is in particular suitable as thermo and/or sound insulating layer for flooring and/or wall coverings. Wood foam does not qualify as a composite and is therefore distinctive over wood polymer composites (WPC), as wood foam is based upon wood only, without mixing wood fibers with synthetic polymers such as PVC, PU, synthetic resin or synthetic glue. The wood foam structure can partly be assigned to the natural chemical bonding between wood fibers, which can be initiated by hydrogen peroxide added during the production process. These chemical forces on their own, however, are not enough to give adequate mechanical strength. Hence, the wood foam of the foamed layer preferably consists of (naturally) chemically bound wood fibers. A second factor being cause of the structure of wood foam is the physical anchorage and entanglement between (strands of) wood fibers. For example, untreated wood fibers have very smooth surfaces whereas in order to provide anchorages the fibers should be roughened. This could for example be done by grinding the base material in a refiner that has roughens the wood fibers thereby disintegrating their surface to a state where they are no longer able to slide past one another. Via the natural chemical bonding of the roughened wood fibers can than results in wood foams with relatively high mechanical strength which can be produced without using any adhesives. Wood foam typically has a substantially open pore structure. Due to the rigid construction of the wood foam, the foamed layer as such may be a (substantially) rigid layer. The foamed layer is preferably a waterproof layer. Both hardwood and softwood, as well as other lignocelluloses, are suitable raw materials to produce wood foam.

With regard to the solid layer which comprises densified wood, the use of such material layer has several (other) benefits. Densifying wood considerably enhances the mechanical properties of the wood. Densified wood can be obtained via an engineering process, an example thereof is given hereinafter. It is technically possible to compress wood to 20% of its original thickness resulting in so called complete densification. The densified as meant within the scope of this invention is typically compressed to at least 50% of its original thickness, preferably at least 40% and more preferably at least 30%. In order to obtain such densified wood, natural wood is first boiled in a solution of NaOH/Na2SO3 in order to obtain more porous and flexible wood. The wood is then to be compressed perpendicular to its growth direction at a temperature of at least 100° C. The process involves typically partially removing hemicellulose and lignin of the wood (the harder components of the wood), which is the glue that holds wood cells together. Complete removal of these may result in a poor-quality material, suggesting that some lignin is still required to bind the wood. The cellulose of the wood is left intact and the hydrogen-bonding between the closely spaced cellulose nanofibers enhance the strength of the densified wood. Hence, the densified wood of the solid layer is preferably composed of chemically treated, compressed wood. Preferably, the densified wood of the solid layer comprises less than 20% by weight, more preferably less than 10% by weight of hemicellulose and/or less than 30% by weight, more preferably less than 15% by weight of lignin. The densified wood obtained via this process is rather stable type and is not affected under humid conditions making it suitable for use in flooring and wall- or ceiling constructions. Further, in addition to the excellent mechanical properties of the material, densified wood is a relatively lightweight material which is beneficial for constructing purposes. Densified wood is also suitable as solid layer due to its relatively high scratch-resistance. Instead of the term 'densified wood' also the term 'compressed wood' could be used. The densified wood could be radially densified wood and/or tangentially densified wood. Preferably, the densified wood of the solid layer is at least partially composed of hardwood, such as alder, balsa, beech, hickory, mahogany, maple, oak, teak, walnut, oak, and/or poplar. The hardwood used to make the solid layer preferably comes from angiosperm—or flowering plants— that are not monocots. Typically, the densified wood is waterproof. Hence, the solid layer is preferably a waterproof layer.

In addition to the benefits of the foamed layer according to the present invention and the benefits of the solid layer according to the present invention, the use of both layers in a panel according to the present invention has several technical advantages. Due to both the foamed layer and the solid layer being relatively light-weight combining such results in a relatively light-weight panel which is suitable for application in multiple building areas. The relatively high flexibility of material allows the use as curved or shaped wall panel, or for example as ceiling panel. The panels might also be used as exterior wall cladding as the overall load on the walls can be kept low due to the low weight and density. This also enables easier installation, including possible use of an alternative connecting system as conventional screw and/or nail connections might not be required. However, nailing and/or screwing of panels according to the invention is possible. Further, the combination of used materials is also suitable for, for example, sawing and gluing.

Further, the panel comprises natural materials in both the foamed layer and the solid layer which is desirable from an environmental point of view. However, the materials used have several benefits of conventional natural materials. Wood foam benefits of a relatively high breathability which allows for the scape of captured moisture in a controlled manner. The lack of breathability is a common issue with traditional wood materials such as cedar or other soft woods which may result in wood rot. The solid layer comprising densified wood can thereby provide a protective function for the wood foam foamed layer. Both indoor and outdoor application of panels according to the present invention is conceivable, as well as use in dry and moist areas of the home, like for example in a bathrooms. The foamed layer comprising wood foam can contribute to equalizing of the surface level. This is in particular beneficial when used in flooring, as the use of additional underflooring layers may be omitted. The latter is also conceivable since the wood foam of the foamed layer may be configured such that the required sound and/or heat insulating properties can be obtained. Hence, it is conceivable that the panel according to the present invention replaces the use of a conventional floor, wall or ceiling panel having a separate insulating (polyurethane) layer. The panel according to the present invention has a good expectation of product lifetime. But also if panel(s) should be removed, recycling thereof is rather simple due to the entire panel being wood based. Furthermore, the panel even provides a competitively priced alternative to polyurethane based products, in particular for the more environmentally and health conscious consumers.

In a further possible embodiment, it is conceivable that at least one foamed layer is substantially entirely manufactured of wood foam. It is also conceivable that at least one solid layer substantially entirely manufactured of densified wood.

In a preferred embodiment of the panel, the solid layer comprises a first panel edge comprising a first coupling profile, and a second panel edge comprising a second coupling profile being designed to engage interlockingly with said first coupling profile of an adjacent panel, preferably both in horizontal direction and in vertical direction, a third panel edge comprising a third coupling profile, and a fourth panel edge comprising a fourth coupling profile being designed to engage interlockingly with said third coupling profile of an adjacent panel, preferably both in horizontal direction and in vertical direction. In another possible embodiment it is conceivable that the foamed layer comprises a first panel edge comprising a first coupling profile, and a second panel edge comprising a second coupling profile being designed to engage interlockingly with said first coupling profile of an adjacent panel, preferably both in horizontal direction and in vertical direction, a third panel edge comprising a third coupling profile, and a fourth panel edge comprising a fourth coupling profile being designed to engage interlockingly with said third coupling profile of an adjacent panel, preferably both in horizontal direction and in vertical direction. The panel, and in particular the solid layer, comprising said coupling profiles enables easier constructing of a floor, wall or ceiling covering of a plurality of panels according to the present invention. Partly because of the relatively high density of the solid layer, it is possible to provide the side edges of the solid layer with interconnecting coupling profiles. It is additionally imaginable that the interconnecting coupling profiles are provided in the foamed layer, or in the assembly (laminate) of at least one solid layer and at least one foamed layer. Non-limiting examples of possible interconnecting coupling profiles are described hereinafter. It is for example conceivable that the solid layer is provided with complementary coupling means, such as a tong and groove. However, it is also possible that the interconnecting coupling means are embodied as described below.

In the panel according to the invention, the interconnecting coupling profiles may include respectively a first and a second coupling profile at a respective first and second side edge of the pair of side edges,
  wherein the first coupling profile comprises:
    an upward tongue,
    at least one upward flank lying at a distance from the upward tongue, an upward groove formed in between the upward tongue and the upward flank
wherein the upward groove is adapted to receive at least a part of a downward tongue of a second coupling profile of another, identical panel, and
at least one first locking element, preferably provided at a distant side of the upward tongue facing away from the upward flank,
and wherein the second coupling profile comprises:
a first downward tongue,
at least one first downward flank lying at a distance from the downward tongue,
a first downward groove formed in between the downward tongue and the downward flank, wherein the downward groove is adapted to receive at least a part of an upward tongue of a first coupling profile of another, identical panel, and
at least one second locking element adapted for co-action with a first locking element of the other identical panel, said second locking element preferably being provided at the downward flank.

Furthermore, in the panel according to the invention, the panel may comprise at least one third coupling profile and at least one fourth coupling profile located respectively at a third panel edge and a fourth panel edge, wherein the third coupling profile comprises:
a sideward tongue extending in a direction substantially parallel to the upper side of the panel,
at least one second downward flank lying at a distance from the sideward tongue, and
a second downward groove formed between the sideward tongue and the second downward flank,
wherein the fourth coupling profile comprises:
a third groove configured for accommodating at least a part of the sideward tongue of the third coupling profile of a second identical panel, said third groove being defined by an upper lip and a lower lip, wherein said lower lip is provided with an upward locking element, wherein the third coupling profile and the fourth coupling profile are configured such that the third and fourth coupling profiles of two identical panels can be coupled to each other by means of a turning movement, which involves at least a part of the sideward tongue of a first panel being inserted into the third groove of the other identical panel, and wherein at least a part of the upward locking element of the other panel is inserted into the second downward groove of the first panel.

Preferably, the solid layer has an upper surface area exceeding an upper surface of the foamed layer. Alternatively, the solid layer(s) may be attached to the foamed layer(s) in an offset position. Both options typically make it easier to profile one or more edges of the solid layer, and to interconnect the panels during installation.

Typically, at least one foamed layer has a density between 40 kg/m3 and 300 kg/m3. Here, the mechanical strength varies with the density of the wood foam: the higher the density, the closer the fibers are to one another and the stronger the wood's own bindings and the entanglement anchorages. A higher density may thus result in a higher mechanical strength. It is for example conceivable that at least one foamed layer has a density between 40 kg/m3 and 100 kg/m3 or between 100 kg/m3 and 200 kg/m3 or between 200 kg/m3 and 300 kg/m3.

As indicated already above, in a preferred embodiment of the panel according to the invention, at least one foamed layer is (substantially) free of resin, glue, and/or binder, in particular added binder. Such embodiment is beneficial as health concerns from emissions from any of such additives could be eliminated. The foamed layer is preferably also (substantially) free of any other (chemical) synthetic additive(s), such as one or more synthetic polymers. It is even conceivable that the foamed layer solely consist of wood foam, in particular wood fibers and/or wood strands. It is also beneficial if the panel as such is (substantially) free of resin, binder and/or glue. An embodiment is conceivable wherein at least one foamed layer and at least one solid layer are fused together. In this manner, the use of adhesive(s) and/or coupling agent(s) and/or coupling material)s) could be omitted. Due to the foamed layer and solid layer both comprising wood based materials it is possible to fuse said layers together. The fusion of the core and solid layers typically results in a strong and solid connection between said layers. The change of delamination could also be significantly reduced. However, it is still imaginable that the solid layer(s) is/are glued to the foamed layer(s).

It is possible that the panel comprises a plurality of foamed layers, wherein each foamed layer comprises wood foam. In such embodiment, each foamed layer may have a different density. It may be beneficial to provide a panel comprises multiple foamed layers each comprising wood foam as herewith material properties such as the stiffness can be adapted in a relatively easy manner. The multiple foamed layers could for example be mutually connected via a fusion process. A benefit thereof is that the use of adhesive(s) could be avoided. In a further possible embodiment, the panel may comprise at least one intermediate layer which is enclosed between at least two foamed layers, wherein the intermediate layer preferably comprises densified wood. This configuration would allow for a lightweight panel to be constructed with aforementioned dampening and insulating properties however, with a (substantially) rigid spine for added torsional stiffness and rigidity. It is in particular beneficial if the intermediate layer comprises densified wood would as this would allow for the provision of coupling profiles. Hence, it is conceivable that the panel is a layered panel comprises at least two foamed layers which enclose an intermediate layer, wherein an upper side of the upper layer is attached to the solid layer. Both the solid layer and the intermediate layer may comprise densified wood. For this embodiment, preferably, the intermediate layer is provided with coupling profiles. The coupling profiles could be any of the described examples of coupling profiles for the present invention. The intermediate layer may be substantially similar to the solid layer according to the present invention.

Preferably, at least one foamed layer has a thickness of 2 to 30 mm, preferably 5 to 20 mm, more preferably 5 to 15 mm. It is experimentally found that a foamed layer according to the present invention having such thickness could provide sufficient stability for the panel as such. Depending on the desired application and the desired material characteristics, the thickness of the foamed layer could be chosen. A relatively thick foamed layer could for example provide improved insulating properties.

Typically, the solid layer has a density of at least 800 kg/m3, preferably at least 900 kg/m3, more preferably at least 1000 kg/m3. The density of the solid layer is typically substantially higher than the density of at least one foamed layer. Possibly, the solid layer has a thickness of 1 to 7 mm, preferably 2 to 5 mm.

It is conceivable that at least one foamed layer comprises wood foam made of a single type of wood. A benefit of the use of a wood foam being made of a single type of wood is that it may be cheaper in production. It is also possible that multiple types of wood are used for the production of the wood foam. As already indicated above, the wood foam could for example be made of softwood or hardwood or a combination of both. Non-limiting examples of possible types of wood which could be used to made wood foam for use in the foamed layer are: beech wood and/or pine wood.

In a preferred embodiment, at least one solid layer is affixed, either directly or indirectly, on top of at least one foamed layer. Here, the decorative top surface of the panel may and preferably is at least partially formed by the solid layer. To protect the solid layer a protective coating, such as an oil-based may applied. It is also conceivable that the solid layer is provided with an oil-based coating. The application of an oil-based coating to the solid layer can enhance the dimension stability of the solid layer. Densified wood may get slightly weaker and/or swell under extremely humid condition, such as for a humidity of around 95% humidity. An oil-based coating may prevent this swelling and thus provide a protective coating to the solid layer.

It is also imaginable that at least one foamed layer is affixed, either directly or indirectly, on top of at least one solid layer.

It may be preferred that the panel comprises a decorative top substrate affixed, either directly or indirectly, on top of the solid layer and/or the foamed layer, wherein the decorative top substrate constitutes the decorative top surface of the panel. The top substrate may consist of a single layer or of a plurality of layers. Preferably, the top substrate, if applied, comprises at least one print layer and/or at least one protective (top) layer covering said print layer. The presence of a print layer and/or a protective layer could prevent the panel, and in particular the solid layer to possible damage from scratching and/or from environmental factors such as UV/moisture and/or wear and tear. It is also conceivable that the densified wood solid layer is provided with an oil-based coating prior to at least one print layer and/or protective layer is applied. The print layer may be formed by a film onto which a decorative print is applied, wherein the film is affixed onto the solid layer and/or foamed layer. The print layer may also be formed by at least one ink layer which is directly applied onto a top surface of the solid layer, the foamed layer, or onto a primer layer applied onto the solid layer and/or the foamed layer.

In another possible embodiment, the panel may comprise at least one backing layer attached to a lower side of the foamed layer. The backing layer could for example provide stability and/or protection to the panel. The backing layer may for example comprise a porous natural layer, in particular porous cellulose. The use of a porous cellulose backing layer would allow for the evaporation of moisture from the foamed layer comprising wood foam during the manufacturing process whilst also allowing for the (semi-) porous backing layer to be in contact with the underflooring which offer advantages when combined with instances of floor heating. The presence of such porous backing layer may experience a greater absorption of convective heat radiation into the foamed layer comprising wood foam. It is also possible that another natural fiber material is applied as backing layer, such as but not limited to a non-woven structure based on PLA. However, it is also possible that the backing layer is a non-porous natural layer, preferably a non-porous water vapor barrier layer. A possible non-limiting example of such layer is non-porous cellulose. A non-porous backing layer could prevent moisture from entering the foamed layer comprising wood foam for areas with relatively high levels of moisture (e.g. bathrooms). Both the porous as well as non-porous backing materials will need to be manufactured from heat resistant or crystalline structure preferably, bio-based materials in order to survive the drying conditions used for the manufacture of the foamed layer comprising wood foam.

It is further possible that at least one foamed layer comprises at least one mineral material, in particular concrete. The use of at least one mineral material as filler in the foamed layer may reduce water absorbance of the foamed layer. It is for example possible that 5 to 15% by weight of mineral material is applied in the foamed layer. Wood foam is sensitive to water absorbance, which is undesired as it can encourage fungal attack. The use of at least one mineral material, in particular in said amount, could significantly reduce the rate of water absorption of the wood foam. The use of at least one mineral material in the foamed layer could also result in a higher density of the foamed layer. Instead of a mineral material, it is also conceivable that at least one hydrophobic additive is applied, such as silane and/or wax. Said hydrophobic additives would however have a negative influence on the strength of the foamed layer.

Preferably, each layer of the panel is a (substantially) waterproof layer. Preferably, the decorative panel as such is a waterproof panel. Preferably, the decorative panel as such as a thermally stable (temperature resistant) panel.

In a preferred embodiment of the decorative panel according to the invention, the panel is free of any densified wood based solid layer. In another preferred embodiment of the decorative panel according to the invention, the panel is free of any wood foam based foamed layer.

Preferably, at least one panel layer, in particular at least one solid layer and/or at least one foamed layer, comprises and/or is coated with at least one antimicrobial agent. The one or more incorporated antimicrobial agents inhibit(s) bacterial, fungal, microbial and other pathogen or non-pathogen growth and typically migrates to the tile surface in the course of time, thereby establishing a concentration gradient that controls the growth of microorganisms on contact with the tile surface. Preferably, the antimicrobial agent is selected from (i) organic or organometallic antimicrobial substances such as halogenated phenyl ethers, halogenated salicylanilides, sesquiterpene alcohols, halogenated carbanilides, bisphenolic compounds, general phenols, formaldehyde, quaternary ammonium compounds, pyridine derivatives and hexachlorophene, and/or from (ii) inorganic antimicrobials substance including silver, zinc, or copper in glass or ceramic matrices, wherein the antimicrobial agent preferably comprises 2,4,4'-trichloro-2'-hydroxydiphenyl ether. Said antimicrobial agent may also be a chemical selected from the group consisting of triclosan, ortho phenyl phenol, diiodomethyl p-tolylsulfone, zinc pyrithiones, sodium pyrithiones, azoles, such as propiconazoles, poly (hexamethylene biguanide) hydrochloride, 3,4,4'trichloro-carbanilide, barium mono hydrate and silver, copper or zinc in zeolite or amorphous glass powder. It is imaginable and rather practical to mix at least one antimicrobial agent with wood foam (or with precursor wood pulp suspension) during production of the foamed layer.

The invention further relates to a decorative covering, in particular a decorative floor covering, decorative ceiling covering, or decorative wall covering, comprising a plurality of decorative panels according to the present invention, in particular a plurality of mutually coupled decorative panels according to the present invention. As indicated above, due to the relatively high flexibility of the layers the covering can be applied in a curved or shaped configuration.

The invention further relates to a method of manufacturing a decorative panel, in particular a floor panel, ceiling panel or wall panel, preferably a decorative panel according to the present invention, the method comprising the steps of:

provising at least one foamed layer comprising an upper side and a lower side, wherein the foamed layer comprises wood foam, and providing at least one decorative solid layer comprising densified wood, affixing the solid layer onto the upper side of the foamed layer.

It is conceivable that the solid layer is affixed onto the upper side of the foamed layer by means of fusion, also referred to as heat fusion, typically by means of melting at least a part of the boundary zones (boundary surfaces) of the solid layer and the foamer layer. The method may further comprise machining of the panel edges of the solid layer such that a first panel edge comprising a first coupling profile, and a second panel edge comprising a second coupling profile being designed to engage interlockingly with said first coupling profile of an adjacent panel, preferably both in horizontal direction and in vertical direction, a third panel edge comprising a third coupling profile, and a fourth panel edge comprising a fourth coupling profile being designed to engage interlockingly with said third coupling profile of an adjacent panel, preferably both in horizontal direction and in vertical direction. It is also possible that the method further comprises the step of affixing at least one print layer and/or at least one protective layer to an upper side of the solid layer and/or affixing at least one backing layer to a lower side of the foamed layer. Non-limiting examples of such layers are described above.

The ordinal numbers used in this document, like "first", "second", and "third" are used only for identification purposes. Hence, the use of the expressions "third locking element" and "second locking element" does therefore not necessarily require the co-presence of a "first locking element". The decorative panels according to the invention may also be referred to as decorative tiles. By "complementary" coupling profiles is meant that these coupling profiles can cooperate with each other. However, to this end, the complementary coupling profiles do not necessarily have to have complementary forms. By locking in "vertical direction" is meant locking in a direction perpendicular to the plane of the panel. By locking in "horizontal direction" is meant locking in a direction perpendicular to the respective coupled edges of two panels and parallel to or falling together with the plane defined by the panels.

BRIEF DESCRIPTION OF THE DRAWINGS

The invention will be elucidated on the basis of non-limitative exemplary embodiments shown in the following figures.

Figure 1A:
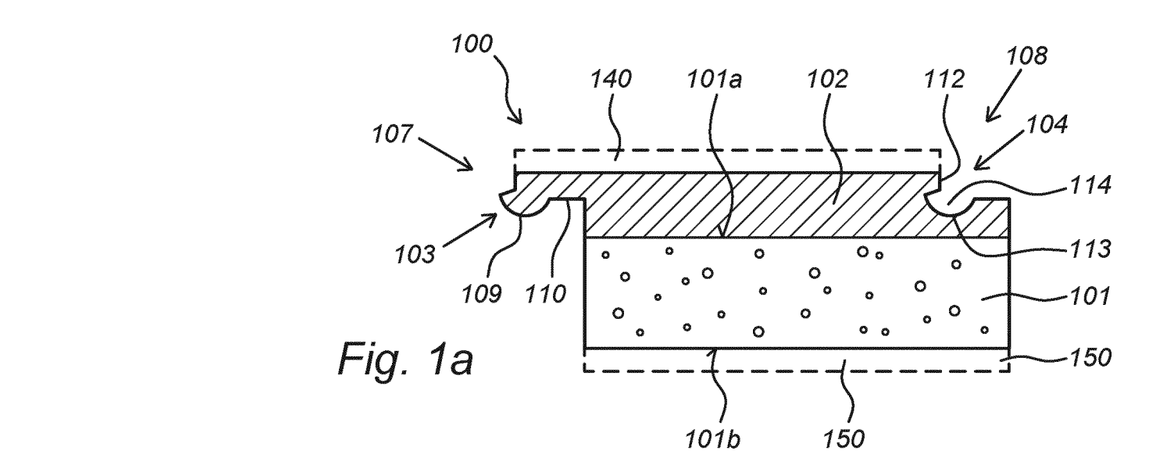
Figure 1B:
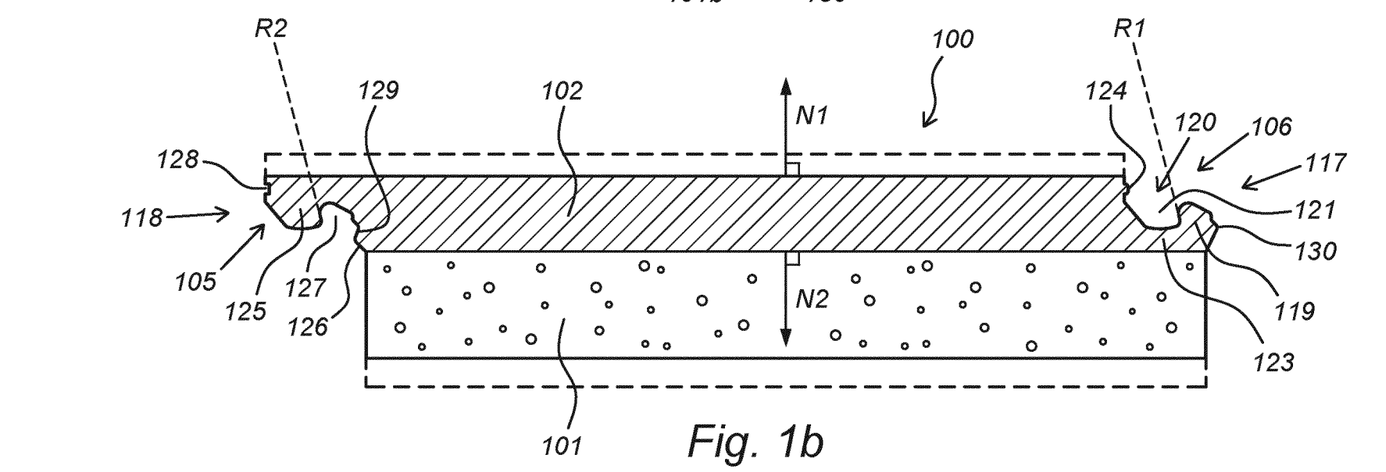

FIGS. 1a and 1b show a cross-sectional views of a decorative panel 100 according to the present invention. The panel 100 comprises a foamed layer 101 comprising an upper side 101a and a lower side 101b, and a decorative solid layer 102. The decorative solid layer 102 is affixed on said upper side 101a of the foamed layer 101. The foamed layer 101 comprises wood foam, the wood foam has a substantially open pore structure. The decorative solid layer comprises densified wood. Optionally, the panel 100 may comprise a print layer 140 and/or at least one protective layer 140. It is also conceivable that the panel 100 comprises a backing layer 150 attached to a lower side of the foamed layer 101. The solid layer 102 is in the shown embodiment provided with, optional, interlocking coupling profiles 103, 104, 105, 106.

FIG. 1a shows a possible shape of the complementary first edge 107 and second edge 108 of the solid layer 102. The first edge 107 comprises a sideward tongue 109 which is integrally connected to the solid layer 102. A front region of the sideward tongue 109 is provided with a rounded bottom surface. An outer end of the rounded bottom surface adjoins an inclined locking surface. An opposite end of the rounded bottom surface adjoins a bearing surface 110 making part of a back region of the sideward tongue 109. The second edge 108 of the solid layer 102 comprises an upper lip 112 and a lower lip 113 defining a recess 114. Both lips are integrally connected to the solid layer 102. The recess 114 has a shape which is complementary to the shape of the sideward tongue 109. More in particular, a top surface of a back region of the lower lip 113 has a (complementary) rounded shape, configured to co-act with the rounded front region of the sideward tongue 109, while a front region of the lower lip 113 is provided with a upwardly protruding shoulder, configured to co-act with the bearing surface of the sideward tongue 109. A lower surface of the upper lip 112 is inclined and corresponds to the locking surface of the sideward tongue 109. Locking at the first edge 107 and the second edge 108 of adjacent tiles 100 by insertion of the sideward tongue 109 of a tile 100 to be coupled into the recess 114, wherein said tile 100 is initially held in an inclined position. After insertion of the sideward tongue 109 into the recess 114, the tile 100 to be coupled will be pivoted (angled) in downward direction about an axis parallel to the first edge 107 until both tiles 100 are positioned in the same—commonly horizontal—plane, wherein the locking surface of the sideward tongue 109 will engage the locking surface of the upper lip 112, and wherein at least a bottom front part is accommodated substantially form-fittingly in the recess 114, and wherein the bearing surface is supported by the shoulder. Locking at the first edge 107 and the second edge 108 leads to locking of the connected tiles 100 in both horizontal direction and vertical direction. The angling down locking principle of the first and second edges 107, 108 is a relatively easy locking principle which facilitates mutual coupling of tiles at these edges 107, 108 tremendously.

FIG. 1b shows a possible shape of the complementary third edge 117 and fourth 118 edge. The third edge 117 comprises an upward tongue 119, an upward flank 120 and an upward groove 121 formed between the upward tongue 119 and the upward flank 120. The upward tongue 119 is connected to the solid layer 102 by means of a bridge 123, which is preferably resilient to some extent. A side of the upward tongue 119 facing toward upward flank 120 extends in the direction of the normal N1 of the upper side of the solid layer 102. The tangent R1 and the normal N1 of the upper side of the solid layer 102 are thus directed toward each other (converging orientation), wherein the angle enclosed by R1 and N1 is preferably between 0 and 10 degrees in this exemplary embodiment. Due to the converging orientation of the upward flank 120 and the side of the upward tongue 119 facing toward to the upward flank 120, the upward groove is a closed groove, which is only accessible to a complementary counterpart by deformation of the upward tongue 119 and/or bridge 123. Another side of upward tongue 119 facing toward upward flank 120 forms an aligning edge enabling facilitated realization of a coupling to an adjacent tile 100. A lower part of upward flank 120 is oriented diagonally, while an upper part of upward flank 120 is shown to be substantially vertical and forms a stop surface for the fourth edge 118. In between the inclined part 120 and the substantially vertical part of the upward flank an additional coupling element, in particular an additional bulge 123 is provided. A lower wall part of the upward groove 121 is oriented substantially horizontally in this exemplary embodiment. The fourth edge 118 is substantially complementary to third edge 117. The fourth edge 118 comprises a downward tongue 125, a downward flank 126 and a downward groove 127 formed in between downward tongue 125 and downward flank 126. A side of downward tongue 125 facing toward downward flank 126 lies in the direction of the normal N2 of the lower side of the solid layer 102. This means that a tangent R2 of side of downward tongue 125 and the normal of the lower side of the solid layer 102 are mutually converging, wherein the angle enclosed by R2 and N2 is preferably between 0 and 10 degrees in this exemplary embodiment. More preferably, the inclination of R1 is identical to the inclination of R2; hence, R1 and R2 are preferably parallel. Due to the converging orientation of the downward flank 126 and the side of the downward tongue 125 facing toward to the downward flank 126, the downward groove 127 is a closed groove, which is only accessible for the upward tongue 119 of an adjacent tile 100 by deformation of the downward tongue 125 and/or bridge, as a result of which the entrance of the downward groove can be widened (temporary). The inclining side of downward tongue 125 also functions as aligning edge for the purpose of further facilitating coupling between two tiles 100. Another side facing away from downward flank 126 takes a substantially vertical form, though is provided with a small cavity 128 configured to co-act with the additional bulge 124 of another tile 100. The downward flank 126 is oriented substantially vertically and is provided with a recess 129 adapted to receive the outward bulge 130 of the upward tongue 119 (of an adjacent tile).

Figure 2A:
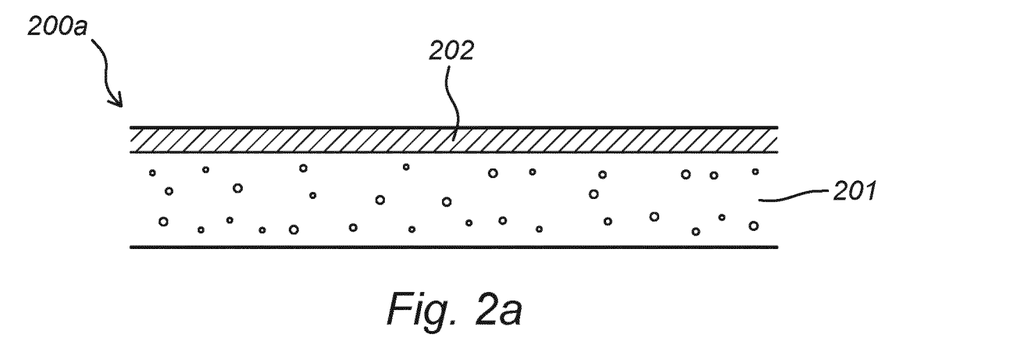
Figure 2B:
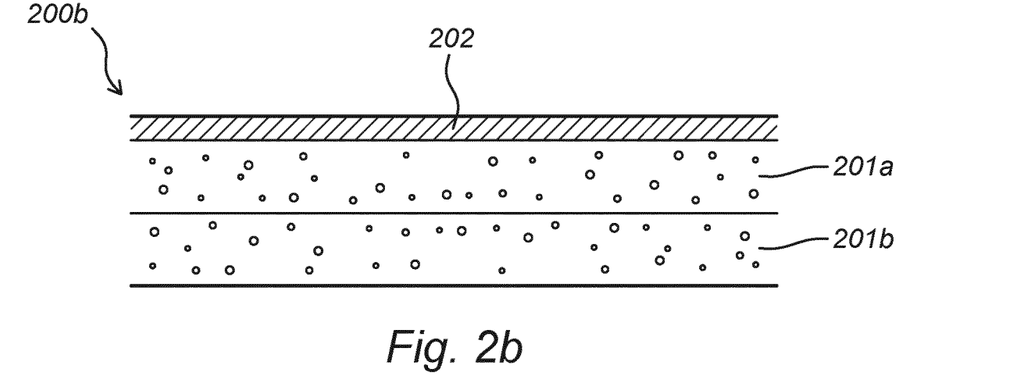
Figure 2C:
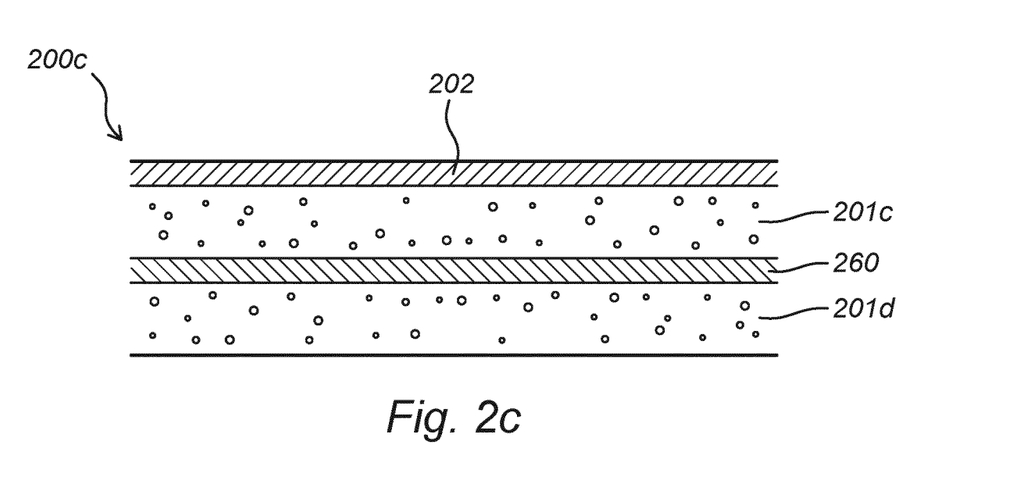

FIGS. 2a-2c show examples of possible embodiments of decorative panels 200a-200c according to the present invention. Each figure shows a cross section of the panel 200a-200b. FIG. 2a shows a decorative panel 200a according to the present invention comprising one foamed layer comprising wood foam and one decorative solid layer 202 affixed on said upper side of the foamed layer. The decorative solid layer 202 comprises densified wood. Said layers 201, 202 can be mutually connected by means of fusion. In a preferred embodiment, the solid layer 202 is provided with coupling profiles. However, it is also conceivable that the foamed layer 201 is provided with interconnecting coupling profiles (not shown). FIG. 2b shows a decorative panel 200b according to the present invention, wherein the panel 200b comprises a plurality of foamed layers 201a, 201b. Each foamed layer 201a, 201b comprises wood foam. In the shown embodiment, the upper foamed layer 201a has a higher density than the lower foamed layer 201b. FIG. 2c shows a decorative panel 200c which comprises a solid layer 202 and an intermediate layer 260 which is enclosed between two foamed layers 201c, 201d. The intermediate layer 260 comprises densified wood, and can be provided with interconnecting coupling profiles (not shown).

DESCRIPTION OF THE INVENTION

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof. Further, when it is referred to a material property, like "rigid", "waterproof", this means that this material property is at least predominantly present in the discussed material, and is more present than an opposite material property. Hence, each material property may be understood in practice as being the cited material property preceded by the adverb "substantially", e.g. "substantially rigid", "substantially waterproof". The same applies to embodiments wherein reference is made to a material composition, in particular in cases wherein the expression "free of" is used. This latter expression may be understood in practice as "substantially free of", as—in practice—traces or other small amounts of the negatively cited constituent may still be present in the composition referred to.

The invention claimed is:

1. A decorative panel, comprising:
   at least one solid layer comprising an upper side and a lower side, wherein the solid layer is at least partially made of densified wood, and
   at least one foamed layer affixed, either directly or indirectly to the solid layer, wherein the foamed layer is made of wood foam,
   wherein the decorative panel is provided with a decorative top surface.

2. The panel according to claim 1, wherein the panel comprises:
   a first panel edge comprising a first coupling profile, and a second panel edge comprising a second coupling profile being designed to engage interlockingly with said first coupling profile of an adjacent panel, both in horizontal direction and in vertical direction; and/or
   a third panel edge comprising a third coupling profile, and a fourth panel edge comprising a fourth coupling profile being designed to engage interlockingly with said third coupling profile of an adjacent panel, both in horizontal direction and in vertical direction.

3. The panel according to claim 2, wherein the coupling profiles are at least partially provided in the solid layer.

4. The panel according to claim 1, wherein at least one foamed layer has a density between 40 and 300 kg/m3.

5. The panel according claim 1, wherein the wood foam of the foamed layer consists of chemically bound wood fibers, and wherein the wood fibers are additionally bound by physical anchorage and entanglement of wood fibers and/or strands of wood fibers.

6. The panel according to claim 1, wherein the foamed layer is a rigid layer.

7. The panel according to claim 1, wherein the panel comprises a plurality of foamed layers, wherein each foamed layer comprises wood foam.

8. The panel according to claim 7, wherein the panel comprises at least one intermediate layer which is enclosed between at least two foamed layers, wherein the intermediate layer comprises densified wood.

9. The panel according to claim 1, wherein at least one foamed layer has a thickness of 2 to 30 mm.

10. The panel according to claim 1, wherein the solid layer has a density of at least 800 kg/m3.

11. The panel according to claim 1, wherein the solid layer has a thickness of 1 to 10 mm.

12. The panel according to claim 1, wherein the densified wood of the solid layer is composed of chemically treated, compressed wood.

13. The panel according to claim 1, wherein the densified wood of the solid layer comprises less than 10% by weight of hemicellulose, and/or wherein the densified wood of the solid layer comprises less than 15% by weight of lignin.

14. The panel according to claim 1, wherein at least one foamed layer and at least one solid layer are glued together.

15. The panel according to claim 1, wherein the decorative top surface of the panel is at least partially formed by the solid layer.

16. The panel according to claim 1, wherein the panel comprising a decorative top substrate affixed, either directly or indirectly, on top of the solid layer and/or the foamed layer, wherein the decorative top substrate constitutes the decorative top surface of the panel, and wherein the decorative top substrate comprises at least one print layer and at least one protective layer covering said print layer.

17. The panel according to claim 1, wherein each layer of the panel is a waterproof layer.

18. The panel according to claim 1, wherein at least one panel layer comprises and/or is coated with at least one antimicrobial agent.

19. The decorative covering comprising a plurality of decorative panels according to claim 1.

20. A method of manufacturing a decorative panel comprising the steps of:
   a) providing at least one foamed layer comprising an upper side and a lower side, wherein the foamed layer comprises wood foam, and
   b) providing at least one decorative solid layer comprising densified wood, affixing the solid layer onto the upper side or lower side of the foamed layer.

* * * * *